3,663,542
PROCESS FOR THE PREPARATION OF ALKOXY-BIS(ALKYLAMINO)-s-TRIAZINES
Howard V. Lemaster, Mobile, Ala., assignor to Geigy Chemical Corporation, Greenburgh, N.Y.
No Drawing. Filed Oct. 2, 1970, Ser. No. 77,676
Int. Cl. C07d 55/20
U.S. Cl. 260—249.8          10 Claims

ABSTRACT OF THE DISCLOSURE

A method for the preparation of alkoxy-bis(alkylamino)-s-triazines by reacting halogeno-bis(alkylamino)-s-triazines with aliphatic alcohols at elevated pressures in the presence of a slight excess of alkali.

---

This invention relates to a new process for the alkoxylation of halogeno-bis(alkylamino)-s-triazines.

To obtain high yields in alkoxylation processes of halogeno-bis(alkylamino)-s-triazines it is necessary to perform the reaction in the presence of excess alkali. However, because of long reaction times, this results in a significant reduction of theoretically possible yields due to concurring hydrolysis reactions.

It has now been found that by applying slightly higher than atmospheric pressures, the reaction can be performed not only in the presence of no or only a very small excess of alkali but also gives essentially quantitative yield in very short reaction times.

Therefore the new method of alkoxylation of halogeno-bis(alkylamino)-s-triazines comprises reacting an alcohol having from 1 to 8 carbon atoms, preferably from 1 to 3 carbon atoms, with a halogeno-bis(alkylamino)-s-triazine in the presence of 1 to 1.2, preferably 1.02 to 1.15 equivalents of an alkali hydroxide, preferably sodium hydroxide, for reaction times of from 5 to 120 minutes, preferably of from 30 to 60 minutes and at pressures of from 1.5 to 2.0 atm.

Examples of alcohols which may be used are ethanol, propanol, isopropanol, butanol, isobutanol, sec-butanol, tert-butanol, pentanol, isopentanol, hexanol or octanol. Especially suitable for the process of the invention is methanol.

Alkyl groups in the halogeno-bis(alkylamino) - s - triazines contain preferably from 1 to 6 carbon atoms as e.g., methyl, ethyl, n-propyl, isopropyl, n-butyl, sec-butyl, tert-butyl, n-pentyl, isopentyl, neopentyl, tert-pentyl or hexyl. Each of the amino groups can be substituted by one or two alkyl groups. Therefore the expression halogeno-bis(alkylamino)-s-triazine encompasses both halogeno-bis(monoalkylamino)-s-triazines and halogeno-bis-(dialkylamino)-s-triazines. The same is true of course for the resulting alkoxy-bis(alkylamino)-s-triazines. Halogeno groups in the halogeno-bis(alkylamino) - s - triazines are e.g. fluoro, bromo and especially chloro groups. Preferred triazines for the present invention are 2-chloro-4,6-bis(isopropylamino)-s-triazine and 2-chloro-4-sec-butylamino-6-ethylamino-triazine.

A preferred method of performing the process of the invention involves adding the desired halogenotriazine precursor and the alkali hydroxide to the corresponding alcohol which at the same time acts as solvent and therefore is present in a large excess. This alcoholic solution may contain small amounts of water which does not affect the result of the reaction. The reaction mixture is placed in a vessel equipped to sustain low pressures. The vessel is sealed off and heated to such a temperature as to obtain a pressure of from 1.5 to 2.0 atm. The vessel is maintained at this temperature from 5 minutes to 2 hours, preferably 30 minutes to 1 hour. The product is then isolated according to conventional procedures e.g., by recovering the excess alcohol by distillation, adding a non-watermiscible solvent for the alkoxy-bis(alkylamino)-s-triazine and extracting the formed alkali halogenide with water. Removal of the non-water miscible solvent yields the desired end-product.

The resulting alkoxy-bis(alkylamino) - s - triazine compounds are well known as valuable herbicides. It is very surprising that the relatively low increase of pressure reduces the reaction time by factor of up to 20–40 as compared to prior art processes and nonetheless substantially quantitative yields are obtained. Therefore this new process makes this very important class of compounds available in a much more economic way than prior art processes.

The following non-limiting examples illustrate the invention.

EXAMPLE I 2-methoxy-4,6-bis(isopropylamino)-s-triazine

Methanol (10.8 moles or 346 g.), sodium hydroxide (50%) (0.765 mole or 61 g.) and 2-chloro-4,6-bis(isopropylamino)-s-triazine (0.744 mole or 174 g.) are placed in a 500 ml. Parr reactor equipped with agitator, thermometer and vent with close-off valve. The reactor was sealed and heated with stirring to 100° C. (resulting pressure of 1.5 to 2 atm.) and held at these conditions for 1 hour. The heat was then discontinued and the reactor allowed to cool to approximately 70° C. (no pressure indicated on gauge) and vented. The excess methanol was removed from the crude reaction mass by distillation to approximately 95° C. (reactor temperature) at atmospheric pressure. Toluene (175 g.) and water (approximately 200 ml.) were added to the resulting slurry. The two-phase mixture was then filtered at 75° C. to remove any solids present.

The layers are then separated by decantation and the toluene-product layer freed of toluene by distillation under reduced pressure. The molten product was allowed to crystallize yielding 170.5 g. solid product, representing a yield of 99.5 percent of theory.

*Analyses.*—Purity: 98.1% (perchloric acid tritration); NaCl: 0.01%; $H_2O$: 0.01%; 2-hydroxy-4,6-bis(isopropylamino)-s-triazine: 0.5%.

By using in the above example instead of sodium hydroxide 0.765 mole of potassium hydroxide and otherwise following the same procedure as given above, the same end-product is obtained.

EXAMPLE II 2-methoxy-4,6-bis(isopropylamino)-s-triazine

Methanol (10.8 moles or 346 g.), sodium hydroxide (50%) (0.0875 mole or 70 g.) and 2-chloro-4,6-bis(isopropylamino)-s-triazine (0.744 mole or 174 g.) are reacted and refined in the same mannner as described in Example I. A solid product weighing 170.7 g. was obtained, representing a yield of 99.9 percent of theory.

*Analyses.*—Purity: 99.2% (perchloric acid titration); NaCl: 0.02%; $H_2O$: 0.01%; 2-hydroxy-4,6-bis(isopropylamino)-s-triazine: 0.25%.

EXAMPLE III 2-methoxy-4-sec-butylamino-6-ethylamino-s-triazine

Methanol (10.8 moles or 346 g.), sodium hydroxide (50%) (0.765 mole or 61 g.) and 2-chloro-4-sec-butylamino-6-ethylamino-s-triazine (0.744 mole or 174 g.) are reacted and refined in the same manner as described in Example I. A solid product weighing 169.9 g. was obtained, representing a yield of 99.9 percent of theory.

*Analyses.*—Purity: 99.5% (perchloric acid titration); NaCl: 0.01%; $H_2O$: 0.01%; hydroxy triazines: 0.1%.

EXAMPLE IV

2-isopropoxy-4,6-bis(isopropylamino)-s-triazine

Isopropanol (5.83 moles or 350 g.), sodium hydroxide (50%) (0.81 mole or 65 g.) and 2-chloro-4,6-bis(propylamino)-s-triazine (0.75 mole or 175 g.) are reacted and refined in the same manner as described in Example I. A solid product weighing 188.7 g. was obtained, representing a yield of 99.3% of theory.

*Analyses.*—Purity: 99.5% (perchloric acid titration); NaCl: 0.01%; $H_2O$ 0.02%; 2-hydroxy-4,6-bis(isopropylamino)-s-triazine: 0.2%.

EXAMPLES V–XI

If in Example I, with otherwise the same procedure, instead of the 2-chloro-4,6-bis(isopropylamino)-s-triazine an equivalent amount of one of the halogeno-triazines given in col. 2 of the following table and instead of methanol an equivalent amount of one of the alcohols given in col. 3 of the following table are used, the alkoxy-triazines given in col. 4 of the following table are obtained.

amino)-s-triazine in the presence of 1 to 1.2 equivalents of an alkali hydroxide for reaction times of from 5 to 120 minutes and at pressures of from 1.5 to 2.0 atm.

2. A method according to claim 1 wherein said reaction time is from 30 to 60 minutes.

3. A method according to claim 1 wherein the reaction is preformed in the presence of 1.02 to 1.15 equivalents of an alkali hydroxide.

4. A method according to claim 1 wherein said alcohol has from 1 to 3 carbon atoms.

5. A method according to claim 1 wherein said alcohol is methanol.

6. A method according to claim 1 wherein said alkali hydroxide is sodium hydroxide.

7. A method according to claim 1 wherein said halogeno-bis(alkylamino)-s-triazine has from 1 to 6 carbon atoms in each of its alkylamino groups.

8. A method according to claim 7 wherein said halogeno-bis(alkylamino)-s-triazine is the chloro-bis-alkylamino-s-triazine.

TABLE

| Ex. No. | Halogeno-triazine | Alcohol | Alkoxy-triazine |
|---|---|---|---|
| 5 | 2-Cl-4,6-bis(ethylamino)-s-triazine | $CH_3CH_2CH_2CH_2OH$ | 2-($OCH_2CH_2CH_2CH_3$)-4,6-bis(ethylamino)-s-triazine |
| 6 | 2-Cl-4-isopropylamino-6-ethylamino-s-triazine | $CH_3(CH_2)_5OH$ | 2-$O(CH_2)_5CH_3$-4-isopropylamino-6-ethylamino-s-triazine |
| 7 | 2-Br-4-diethylamino-6-ethylamino-s-triazine | $CH_3(CH_2)_7OH$ | 2-$O(CH_2)_7CH_3$-4-diethylamino-6-ethylamino-s-triazine |
| 8 | 2-F-4-butylamino-6-propylamino-s-triazine | $CH_3(CH_2)_4OH$ | 2-$O(CH_2)_4CH_3$-4-butylamino-6-propylamino-s-triazine |
| 9 | 2-Cl-4-hexylamino-6-dimethylamino-s-triazine | $(CH_3)_2CH-CH_2CH_2OH$ | 2-$OCH_2CH_2CH(CH_3)_2$-4-hexylamino-6-dimethylamino-s-triazine |
| 10 | 2-Br-4-isopropylamino-6-diethylamino-s-triazine | $CH_3CH_2OH$ | 2-$OCH_2CH_3$-4-isopropylamino-6-diethylamino-s-triazine |
| 11 | 2-Cl-4,6-bis(hexylamino)-s-triazine | $CH_3CH_2OH$ | 2-$OCH_2CH_3$-4,6-bis(hexylamino)-s-triazine |

What is claimed is:

1. A method for alkoxylation of halogeno-bis(alkylamino)-s-triazines comprising reacting an alcohol having from 1 to 8 carbon atoms with a halogeno-bis(alkyl- 9. A method according to claim 8 wherein said chloro-bis(alkylamino)-s-triazine is 2-chloro-4,6 - bis(isopropylamino)-triazine.

10. A method according to claim 8 wherein said chlorobis(alkylamino)-s-triazine is 2-chloro-4-sec-butylamino-6-ethylamino-triazine.

References Cited

UNITED STATES PATENTS

| | | | |
|---|---|---|---|
| 3,164,593 | 1/1965 | Moergeli | 260—249.8 XR |
| 3,207,756 | 9/1965 | Knusli et al. | 260—249.8 |
| 3,255,191 | 6/1966 | Dexter et al. | 260—249.8 XR |
| 3,303,015 | 2/1967 | Speziale | 260—249.8 XR |

JOHN M. FORD, Primary Examiner

U.S. Cl. X.R.

71—93